United States Patent [19]

Halligan

[11] Patent Number: 4,969,380
[45] Date of Patent: Nov. 13, 1990

[54] GYPSUM BOARD GROOVING SYSTEM

[75] Inventor: William S. Halligan, East Concord, N.Y.

[73] Assignee: National Gypsum Company, Dallas, Tex.

[21] Appl. No.: 441,870

[22] Filed: Nov. 27, 1989

[51] Int. Cl.⁵ .......................... B26D 1/24; B26D 3/06
[52] U.S. Cl. ....................................... 83/877; 83/496; 83/878; 144/134 R; 144/136 R; 144/371; 409/157; 409/206
[58] Field of Search ................ 83/875, 876, 877, 878, 83/496, 497; 144/136 R, 134 R, 371; 409/203, 304, 131, 132, 157, 175, 177, 206; 407/57, 64

[56] References Cited

U.S. PATENT DOCUMENTS

| | | | |
|---|---|---|---|
| 1,940,106 | 12/1933 | Snyder | 83/877 X |
| 2,344,003 | 3/1944 | Sheptinsky | 83/877 X |
| 3,010,352 | 11/1961 | Dunlap | 83/565 X |
| 3,672,415 | 6/1972 | Holan | 144/136 R |
| 3,910,170 | 10/1975 | Boy | 83/877 X |
| 4,061,070 | 12/1977 | Groves | 144/136 R X |

Primary Examiner—Frank T. Yost
Assistant Examiner—Kenneth E. Peterson
Attorney, Agent, or Firm—Laird F. Miller; Robert F. Hause

[57] ABSTRACT

An apparatus and method for forming a flat-bottomed V-groove in wallboard involving a pair of oppositely angled circular saws, wherein saw blades have an obtusely angled outer edge, as by grinding back one corner of each of a plurality of carbide tips on at least one of the two saw blades.

20 Claims, 2 Drawing Sheets

GYPSUM BOARD GROOVING SYSTEM

BACKGROUND OF THE INVENTION

This invention relates to a method of forming an elongate, small, flat-bottomed V-groove in a paper-covered gypsum wallboard, and to novel apparatus for use in such method.

U.S. Pat. No. 4,704,837 discloses a wall panel unit formed of a single, paper-covered gypsum wallboard having spaced grooves and, laminated thereto, a sheet of bendable, rigid sheet metal in the area of each groove, each groove having a V-shape of about 100°, with the bottom cover sheet undisturbed and preferably a bare strip of the bottom cover sheet, about ⅛ inch wide, being exposed. There is no mention of any recommended method or apparatus for forming the V-shaped groove.

U.S. Pat. No. 4,000,594 discloses a wall panel unit formed of a single, paper-covered gypsum wallboard having spaced grooves, the sides of which are perpendicular to each other, which grooves, in the preferred embodiment, may be milled or otherwise formed by cutting tools, with no bare strip of the bottom cover sheet exposed.

SUMMARY OF THE INVENTION

The present invention is directed to a method and to apparatus for forming a V-shaped groove with about a ⅛ inch wide flat bottom, in particular, for forming the V-shaped groove disclosed in U.S. Pat. No. 4,704,837, having a ⅛ inch wide bare strip of the bottom cover sheet, in a grooved gypsum wallboard.

The method involves cutting a V-groove into a gypsum wallboard using a pair of circular saws, at least one of which saws has an outer periphery of teeth which are shaped, on their outer circumference, with an angled edge, of about ⅛ inch width.

The apparatus consists of a pair of circular saws which are mounted on an assembly, with the saws disposed to produce saw cuts into the top surface of a passing gypsum wallboard, with the saw cuts extending into the wallboard at opposed angles of about 50° to the vertical, and with the outer circumference of at least one saw having an angled edge, which forms a horizontal flat bottom in a V-shaped groove in the wallboard.

It is an object of the invention to provide a method and apparatus for forming a flat-bottomed V-groove in a gypsum wallboard.

It is a further object to provide such a method and apparatus whereby a minimum of dust is created.

BRIEF DESCRIPTION OF THE DRAWINGS

These and other objects and advantages of the invention will be more readily apparent when considered in relation to the preferred embodiments as set forth in the specification and shown in the drawings in which.

DESCRIPTION OF THE PREFERRED EMBODIMENTS

Figure 1:
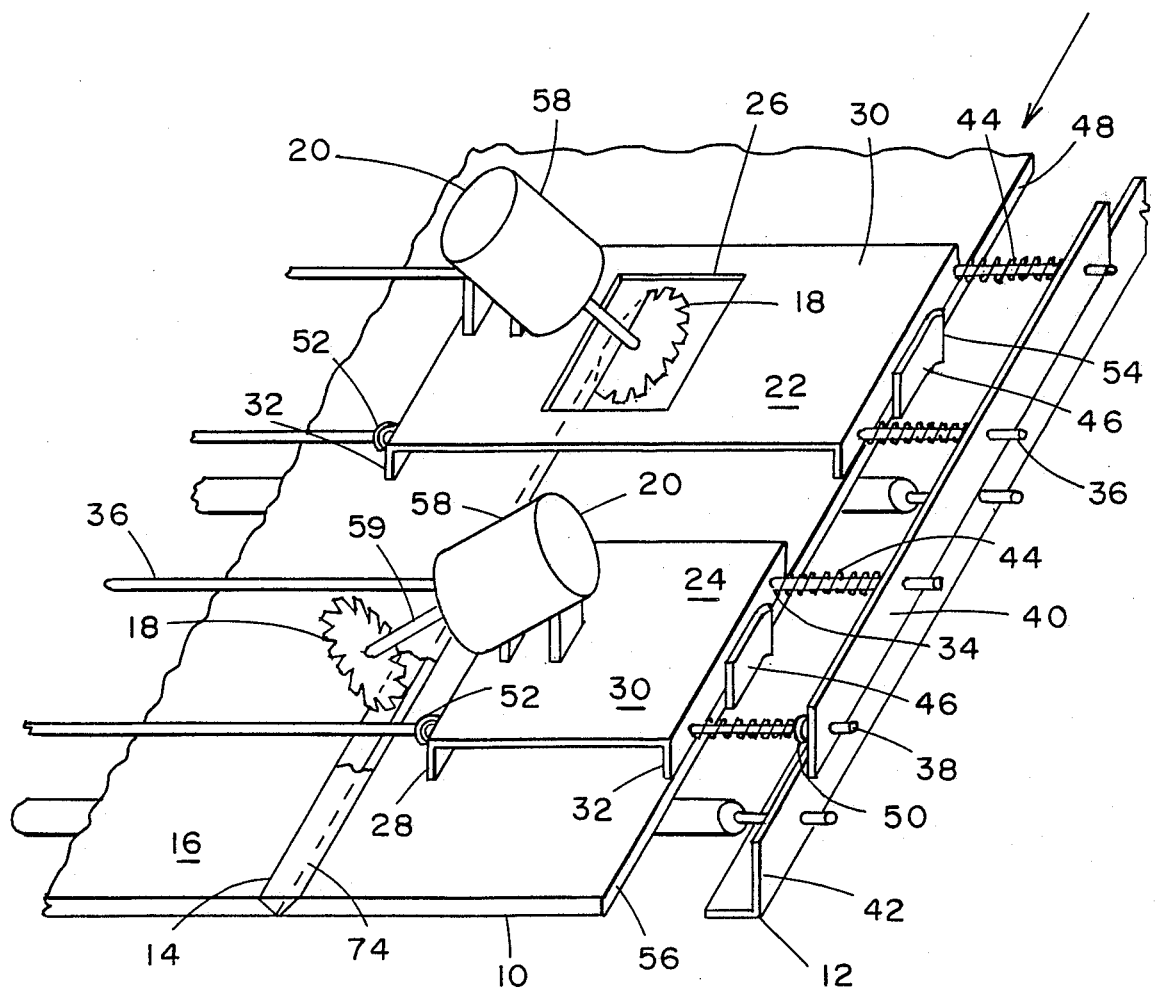
FIG. 1 is an isometric top view of a short section of a gypsum wallboard production facility at a position therealong whereat a pair of opposed circular saws are disposed for cutting the two sides and the flat bottom of an elongate V-groove in the wallboard, extending parallel to the side edge of the gypsum wallboard.
Figure 2:
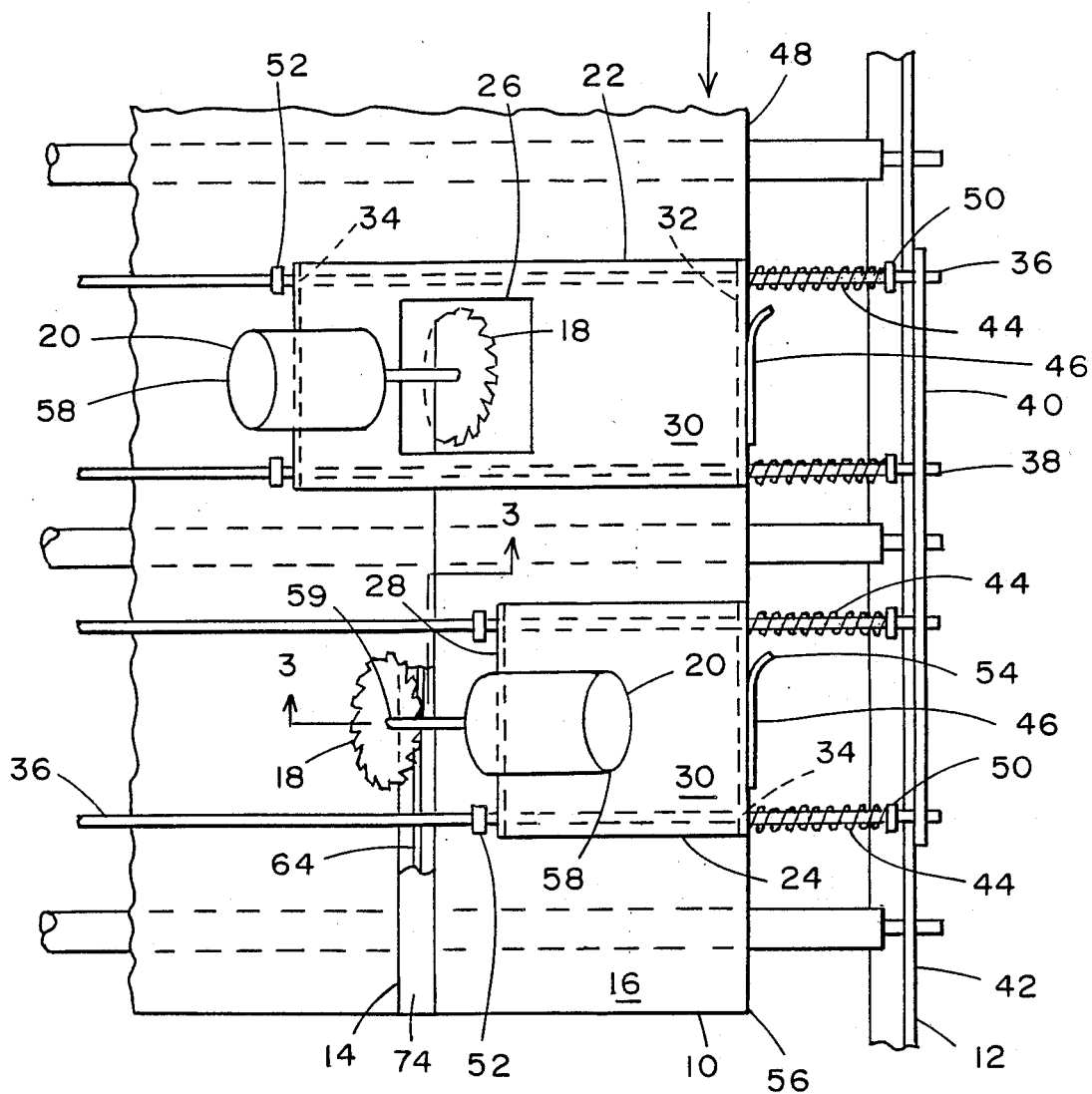
FIG. 2 is a top view of the gypsum wallboard production facility at the position therealong as shown in FIG. 1.

Referring to FIGS. 1 and 2, there is shown a leading right edge corner of gypsum wallboard 10 being advanced along means for supporting an advancing web of wallboard, preferably a roller conveyor 12, at a position along a production line whereat the wallboard 10 has been formed, cut and dried and is being further processed to produce a longitudinally grooved wallboard, such as for a wall panel unit of the type disclosed in U.S. Pat. No. 4,704,837, which disclosure is hereby included by reference.

The wallboard 10 is being advanced in the direction shown by the arrow at the right edge of the wallboard 10. Any means for advancing the wallboard 10, manual or mechanically powered, is suitable. A V-groove 14 will be seen to have been formed in the top, back face 16 of the wallboard 10, formed by saw cuts produced by two circular saw blades 18, 18 which are driven by two circular saw motors 20, 20.

Each motor 20 is mounted atop one of two tables 22, 24. Table 22 is relatively wide with an opening 26 through which a saw blade 18 extends. Table 24 is relatively narrow, with a saw blade 18 extending downward near the inner edge 28 of table 24.

The two tables 22, 24 each have a table top 30 terminating at each side edge in a downwardly extending narrow flange 32. Each flange 32 has two holes 34.

Four support shafts 36 are fixedly mounted above the wallboard 10 with the rod ends 38 mounted in a plate 40, which is attached to a side frame member 42 of conveyor 12.

Each shaft 36 extends from plate 40 through a coil spring 44, then through one of the holes 34 in each flange 32 of one of the tables 22, 24 and thence on across the wallboard 10 and conveyor 12 to the opposite side (not shown) where it extends through a second set of tables 22, 24 (not shown) and springs 44 (not shown) to a plate 40 (not shown) on a frame member 42 (not shown) on the opposite side. This construction, thus, provides for cutting a second parallel V-groove 14 (not shown) along the opposite edge (not shown) of wallboard 10, using method and apparatus similar to that shown and described for the right edge shown.

Each table 22, 24 has a guide plate 46 extending downward to rest against the side edge 48 of the wallboard 10, as the wallboard 10 advances along the conveyor 12. The guide plate 46 is urged inwardly against the wallboard side edge by coil springs 44, which are lightly compressed between a table flange 32 and a fixed shaft outer collar 50, on each shaft 36. An inner collar 52 on each shaft 36, inward of each respective table 22, 24 limits the inward movement of tables 22, 24. The guide plates 46 thus maintain the position of tables 22, 24, and thus of saw blades 18, relative to the side edge 48 of the wallboard 10. Guide plates 46 include an angled end 54 which is angled outwardly to be contacted by the advancing leading edge 56 of each wallboard, which leading edge 56 then moves the guide plate 46 outward to ride along the side edge 48 of wallboard 10.

Mounted atop each table 22, 24 is a circular saw assembly 58 including a motor 20 with a drive shaft 59, at the outer end of which is affixed a circular saw blade 18. Each saw assembly 58 is shown mounted at an angle to the wallboard top back face 16. When used to disclosed in U.S. Pat. No. 4,704,837 the saw assembly 58 is mounted with the saw blade 18 in a plane which is 50° from vertical, whereby the two circular saw blades 18 cut a V-groove of 100°. This angle size can, however, be varied widely in accordance with the present invention.

The embodiment shown in FIGS. 1 and 2 shows, for simplicity of disclosure, the saw assemblies mounted in fixed positions and at a fixed angle; however, adjustability can easily be included in the mounting assembly, and will normally be preferred.

In accordance with the present invention, the circular saw blades 18 have a plurality of carbide tips 60 affixed around the circumference of each circular blade 18. The carbide tips on at least one of the blades 18, and preferably on both blades 18 as shown in FIG. 3 have a radially outermost edge 62 which has been ground back to form an edge 62 which is in a plane which is at an obtuse angle of 140° to the general plane of the saw blade 18, and which is in a plane parallel to the general plane of the wallboard 10.

Figure 3:
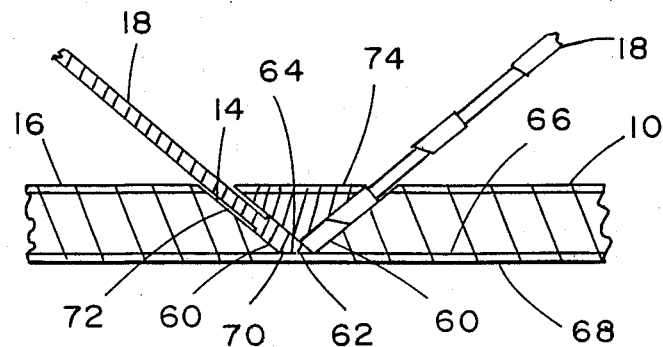
FIG. 3 is an enlarged sectional end view of the gypsum wallboard production facility of FIG. 2, taken along line 3—3, showing only the grooved portion of the gypsum wallboard and the lower edges of the saw blades, including one of the blades with novel angled carbide tips shown in cross-section and a second blade also with novel angled carbide tips disposed behind and partially hidden by the cross-sectioned blade.

Referring to FIG. 3, the angled carbide tip edge 62, which is thus also the circular saw blade angled outer edge 62, forms a flat bottom 64 in the V-groove 14 which, in the embodiment shown, coincides with the inner surface 66 of the wallboard bottom front face paper 68.

By using circular saw blades 18 which have angled outer edges 62 in both saw assemblies 58, as shown, a greater assurance is provided that the V-groove 14 formed by the two circular saws has the desired flat bottom 64, as desired, wherein a uniform 140° angle is formed along each side corner 70 formed by the flat bottom 64 and each respective angled side wall 72 of the V-groove 14.

In order to show the circular saw blade 18 forming the flat-bottomed V-groove 14, the elongate piece of V-shaped waste matter 74, shown in FIGS. 1 and 2, is omitted in an area immediately around the saw blade 18. Means (not shown) will need to be provided to remove the V-shaped waste matter 74 and to dispose of it.

Having completed a detailed description of the preferred embodiments of my invention so that those skilled in the art may practice the same, I contemplate that variations may be made without departing from the essence of the invention.

I claim:

1. A wallboard grooving apparatus for forming an elongate, flat-bottomed V-groove comprising means for supporting and advancing wallboard closely adjacent a pair of circular saw assemblies, said circular saw assemblies being mounted at an angle, one to another, equal to the angle of a V-groove to be cut into said wallboard, circular saw blades on said saw assemblies disposed to cut a V-groove in advancing wallboard when said wallboard is advanced along said supporting and advancing means, an outer edge on at least one of said circular saws having an obtuse angle formed by said outer edge relative to a general plane of said circular saw, said obtusely angled outer edge being parallel to a top surface of said wallboard to form a flat bottom in a V-groove cut by said saws into said wallboard.

2. A wallboard grooving apparatus as defined in claim 1 wherein said saw blades on each of said circular saw assemblies each have an obtuse angle formed by said outer edge relative to a general plane of said circular saw.

3. A wallboard grooving apparatus as defined in claim 1 wherein said saw blades on each of said circular saw assemblies have a general plane which is disposed at an angle of about 50° from vertical, and said general planes of said respective pair of saw blades are at an angle of about 100° with respect to each other.

4. A wallboard grooving apparatus as defined in claim 3 wherein said outer edge on at least one of said circular saws is disposed in a horizontal plane at the lowest portion of said saw blade, whereby a horizontal flat bottom is formed in a V-groove cut by said saws into a wallboard.

5. A wallboard grooving apparatus as defined in claim 1 wherein said obtuse outer edge on at least one of said circular saws is about ⅛ inch wide.

6. A wallboard grooving apparatus as defined in claim 1 wherein said wallboard has two side edges, and is covered on the bottom by a bottom paper having a top surface, said pair of circular saw assemblies each consist essentially of a motor mounted above a wallboard conveyor, a drive shaft extending angularly downwardly, and a saw blade rotatably affixed to the end of said drive shaft, said saw blade having an outer edge which at the lowest portion thereof, is spaced above a top plane of said conveyor a distance equal to approximately the thickness of wallboard paper, whereby said saw assemblies will form a groove with a flat bottom at the top surface of the bottom paper of a paper-covered wallboard.

7. A wallboard grooving apparatus as defined in claim 6 wherein said motors are mounted on laterally adjustable tables.

8. A wallboard grooving apparatus as defined in claim 7 wherein said laterally adjustable tables are mounted adjacent springs, urging said table inwardly of an edge of said conveyor, and wherein said tables have guide plates for engaging one of said edges of said wallboard on said conveyor, to position said saw blades relative to the edge of wallboard on said conveyor.

9. A wallboard grooving apparatus as defined in claim 1 wherein said saw blades have a plurality of carbide tips forming a set of teeth on said saw blade.

10. A wallboard grooving apparatus as defined in claim 9 wherein the outer edge of said saw blades is formed by said carbide tips.

11. A method of forming a flat-bottomed, elongate V-groove with sidewalls in a flat surface of a wallboard comprising the steps of: providing a plurality of circular saw blades with at least one of said blades having a plurality of cutting tips with said tips all having an outer edge which is at an angle to the plane of the blade equal to the desired angle between one of said side walls and the flat bottom of said flat-bottomed, elongate V-groove, mounting a pair of circular saw assemblies adjacent and at suitable angles to a means for supporting an advancing wallboard to be grooved by said saw assemblies, at least one of said circular saw blades having said angled cutting tips, and advancing said wallboard along said supporting means wherein said angled cutting tips cut the flat bottom of said groove in said wallboard.

12. The method of claim 11 wherein said means for supporting an advancing wallboard includes a horizontally disposed conveyor.

13. The method of claim 12 wherein said circular saw assemblies are mounted above said conveyor.

14. The method of claim 13 wherein said saw assemblies are mounted on laterally adjustable tables, said laterally adjustable tables being positioned by guide plates abutting an edge of said wallboard.

15. The method of claim 11 wherein said pair of circular saw assemblies each include saw blades having said angled cutting tips.

16. The method of claim 15 wherein said angled cutting tips are carbide tips.

17. The method of claim 11 wherein said wallboard is a paper-covered gypsum wallboard.

18. The method of claim 17 wherein said saw blades form a flat-bottomed V-groove in said gypsum wallboard by removing a portion of said wallboard extending down to, but not into a bottom paper cover sheet of said paper-covered gypsum wallboard.

19. The method of claim 18 wherein said wallboard has two side edges, and flat-bottomed V-grooves are simultaneously formed spaced closely inward from and parallel to said two side edges of said wallboard.

20. The method of claim 18 wherein said saw blades cut a flat-bottomed V-groove with groove walls forming a groove of about 100° and a flat bottom of about ⅛ inch width.

* * * * *

UNITED STATES PATENT AND TRADEMARK OFFICE
CERTIFICATE OF CORRECTION

PATENT NO. : 4,969,380
DATED : November 13, 1990
INVENTOR(S) : William S. Halligan It is certified that error appears in the above-identified patent and that said Letters Patent is hereby corrected as shown below:

At column 3, line 5, insert --form V-grooves 14 to produce wall panel units as-- after the word "to" and before the word "disclosed".

Fig. 3, should be deleted to appear as per attached sheet.

UNITED STATES PATENT AND TRADEMARK OFFICE
CERTIFICATE OF CORRECTION

PATENT NO. : 4,969,380

DATED : November 13, 1990

INVENTOR(S) : William S. Halligan

It is certified that error appears in the above-identified patent and that said Letters Patent is hereby corrected as shown below:

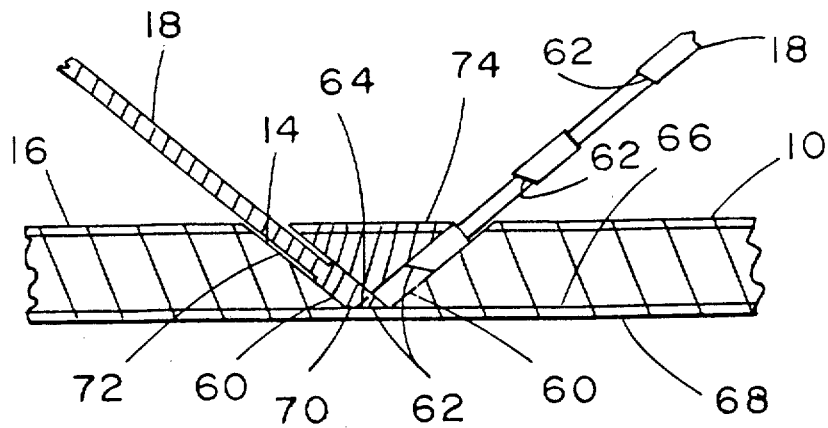

Fig. 3

Signed and Sealed this

Thirteenth Day of August, 1991

Attest:

HARRY F. MANBECK, JR.

*Attesting Officer*   *Commissioner of Patents and Trademarks*